(12) United States Patent
Goto et al.

(10) Patent No.: US 7,270,200 B2
(45) Date of Patent: Sep. 18, 2007

(54) WORKING VEHICLE

(75) Inventors: Renshi Goto, Ehime-ken (JP); Suguru Okamoto, Ehime-ken (JP); Shinya Yoshiki, Ehime-ken (JP)

(73) Assignee: Iseki & Co., Ltd., Matsuyama-shi, Ehime-ken (JP)

( * ) Notice: Subject to any disclaimer, the term of this patent is extended or adjusted under 35 U.S.C. 154(b) by 252 days.

(21) Appl. No.: 11/082,794

(22) Filed: Mar. 18, 2005

(65) Prior Publication Data

US 2006/0042840 A1 Mar. 2, 2006

(30) Foreign Application Priority Data

Aug. 31, 2004 (JP) ............................. 2004-252662
Oct. 13, 2004 (JP) ............................. 2004-298783

(51) Int. Cl.
*B60K 17/001* (2006.01)

(52) U.S. Cl. ................................... 180/6.48

(58) Field of Classification Search ................. 180/6.2, 180/6.48, 6.5, 305, 307
See application file for complete search history.

(56) References Cited

U.S. PATENT DOCUMENTS

| | | | | |
|---|---|---|---|---|
| 6,003,401 A | * | 12/1999 | Smith | .......................... 74/496 |
| 6,390,225 B2 | * | 5/2002 | Velke et al. | ................. 180/333 |
| 6,578,656 B2 | | 6/2003 | Samejima et al. | |
| 7,131,268 B2 | * | 11/2006 | Ohashi et al. | ................. 60/484 |
| 2002/0026779 A1 | * | 3/2002 | Velke et al. | ................ 56/320.2 |
| 2005/0044836 A1 | * | 3/2005 | Goto et al. | ................... 56/14.7 |

FOREIGN PATENT DOCUMENTS

| | | |
|---|---|---|
| JP | 2000-71790 | 3/2000 |
| JP | 2000-270652 | 10/2000 |

OTHER PUBLICATIONS

English language Abstract of JP 2000-71790.
English language Abstract of JP 2000-270652.

* cited by examiner

*Primary Examiner*—Kevin Hurley
(74) *Attorney, Agent, or Firm*—Greenblum & Bernstein, P.L.C.

(57) ABSTRACT

A working vehicle having a pair of left and right HSTs having hydraulic pumps, hydraulic motors and trunnion shafts for regulating the drive speed of the hydraulic motors by varying compressed oil from the hydraulic pumps into the hydraulic motors, in which one hydraulic pump is disposed parallel to the other hydraulic pump in the forward or rearward direction, including drive wheels driven by the HSTs, respectively, a pair of relay shafts between a pair of steering levers for independently operating the trunnion shafts and a pair of trunnion shafts, first connection members for connecting the steering lever and the relay shaft to each other, and second connection members for connecting the relay shaft and the trunnion shaft to each other, and first connection members for connecting the steering lever to the relay shaft to each other, and second connection members for connecting the relay shaft and the trunnion shaft.

6 Claims, 13 Drawing Sheets

FIG. 9
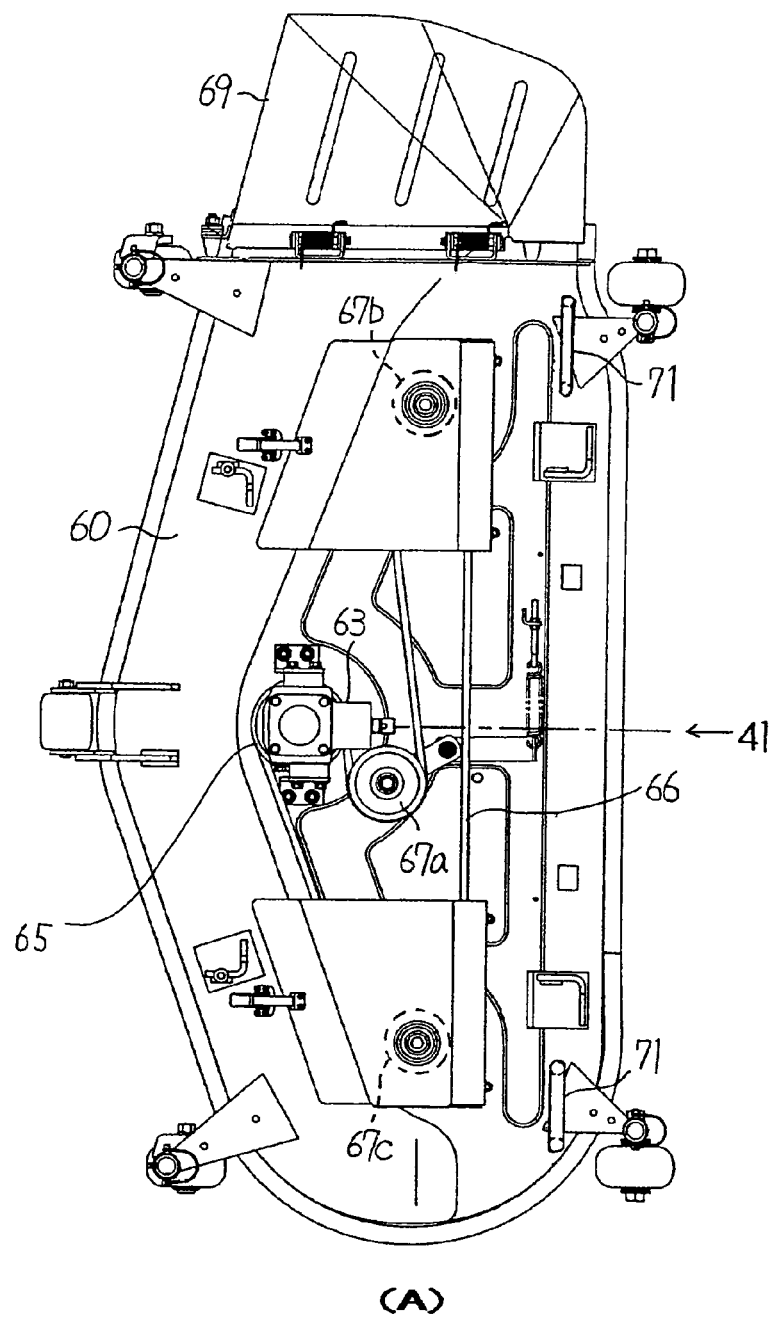
(A)
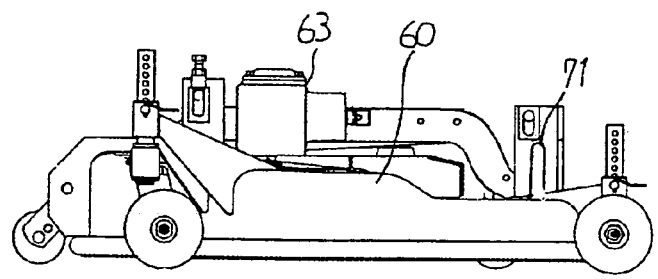
(B)

FIG. 11
(A)
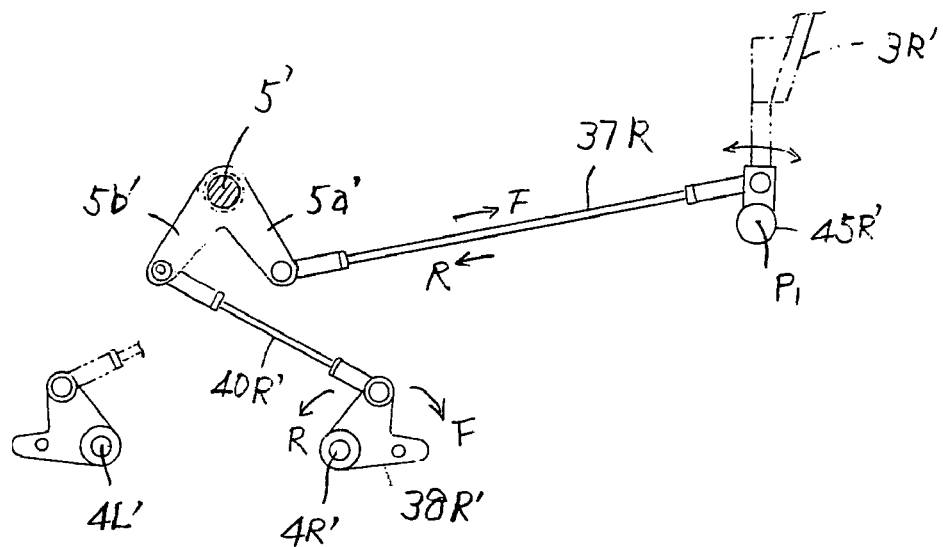
(B)
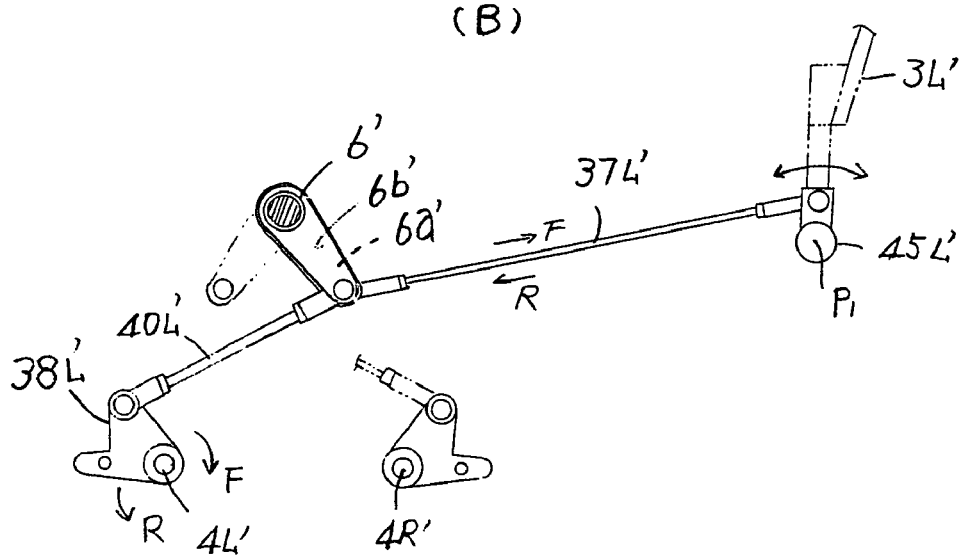

ent invention relates to a working vehicle used
WORKING VEHICLE

BACKGROUND OF THE INVENTION

1. Field of the Invention

The present invention relates to a working vehicle used for gardening maintenance work, agricultural work such as a riding mower and a tractor, and further more construction and transportation work, and, in particular, to a construction of a steering operation device, which is provided with a hydrostatic transmission (hereinafter called "HST") operating as a travel system speed changer unit, for a vehicle steered by varying respective left and right drive wheels by means of respective left and right levers.

2. Description of the Related Art

A riding mower of a prior art such as Japanese Published Unexamined Patent Application No. 2000-71790 is provided with a pair of HSTs consisting of a hydraulic pump and a hydraulic motor, wherein the output rotations of respective left and right HST hydraulic motors are varied by rotating and operating the trunnion shaft of the hydraulic pump by means of respective left and right steering levers equipped at the control seat side, and the output rotations are transmitted to respective left and right rear wheels for travelling.

However, since, in prior art riding mowers, HST is provided at both left and right sides of the transmission case, respectively, it is necessary that assembly and maintenance work is carried out at both left and right sides of the vehicle, respectively, when manufacturing, performing maintenance, adjusting the HST and/or adjusting the connection between the steering levers and HST pump. Therefore, there is a problem in that work efficiency is not satisfactory.

If the HST hydraulic pump is disposed at one side of the vehicle body, the trunnion shafts of the hydraulic pump are separated to be located forward and rearward, and since the operation shaft centers of the left and right steering levers becomes such that the operation shaft centers oriented in the left and right lateral directions are commonly established, the lengths of the interlock connections to the trunnion shafts differs from each other, wherein the operation feeling in the left and right steering levers become different from each other, and there causes a problem in that it becomes difficult to accurately drive or steer the vehicle for rectilinear propagation.

SUMMARY OF THE INVENTION

With the present invention, a steering and operating apparatus of a working vehicle was constructed as described below in view of the above-described problems. That is, a first aspect of the invention is a working vehicle comprising: a hydrostatic transmission (T1) including a hydraulic pump (PL), a hydraulic motor (ML), and a trunnion shaft (4L) for regulating a drive speed of the hydraulic motor (ML) by varying discharge oil pressure fed from the hydraulic pump (PL) into the hydraulic motor (ML); a hydrostatic transmission (T2) including a hydraulic pump (PR) set beside in the forward or rearward direction, which is an advancement direction of a vehicle, with respect to the hydraulic pump (PL), and provided with a trunnion shaft (4R) for regulating a drive speed of the hydraulic motor (MR) by varying discharge oil pressure fed from the hydraulic motor (MR) and hydraulic pump (PR) into the hydraulic motor (MR); a drive wheel (1L) driven and rotated in the forward drive direction or reverse drive direction by the hydrostatic transmission (T1) and disposed in the left direction when being faced toward the drive direction of the vehicle; a drive wheel (1R) driven and rotated in the forward drive direction or reverse drive direction by the hydrostatic transmission (T2) and disposed in the right direction when being faced toward the drive direction of the vehicle; a pair of steering operating tools (3L, 3R) disposed in the cross direction, when being faced toward the drive direction of the vehicle, in order to independently operate the pair of trunnion shafts (4L, 4R), respectively; a pair of relay shafts (6, 5) provided between the pair of trunnion shafts (4L, 4R); first connection members (45L, 47L, 37L, 6a) for connecting the steering operating tool (3L) and the relay shaft (6) with each other; second connection members (6b, 40L, 38L) for connecting the relay shaft (6) and the trunnion shaft (4L) with each other; first connection members (45R, 47R, 37R, 5a) for connecting the steering operating tool (3R) and the relay shaft (5) with each other; and second connection members (5b, 40R, 38R) for connecting the relay shaft (5) and the trunnion shaft (4R) with each other.

According to the invention described in the first aspect, since the relay shafts (6, 5) for relaying a rotation operation of respective left and right steering operation tools (3L, 3R) are provided between two trunnion shafts (4L, 4R), the link ratios in the first and second connection members from the steering operation tools (3L, 3R) to the relay shafts (6, 5) and from the corresponding relay shafts (6, 5) to the trunnion shafts (4L, 4R) can be constructed to be roughly the same, and it becomes possible to make the steering operation feeling identical to each other at both left and right sides.

A second aspect of the invention is the working vehicle in which, in addition to the first aspect of the invention, the two relay shafts (6, 5) driven and rotated in response to respective operations of the pair of left and right steering operating tools (3L, 3R) are disposed so that the distances from the relay shafts (6, 5) to the corresponding trunnion shafts (4L, 4R) become roughly equidistant.

With the inventions according to the first aspect and the second aspect, by operating the steering operation tool (3L), the operation is transmitted to the relay shaft (6), and rotation of the relay shaft (6) is transmitted to the trunnion shaft (4L) via the second connection member, wherein the speed of the left drive wheel (1L) is varied. Also, by operating the steering operation tool (3R), the operation is transmitted to the relay shaft (5), and rotation of the relay shaft (5) is transmitted to the trunnion shaft (4R) via the second connection member, wherein the speed of the left drive wheel (1R) is varied.

According to the invention described in the second aspect, since the distances from the relay shafts (6, 5) to the respective trunnion shafts (4L, 4R) are roughly equidistantly established, the second connection members from the relay shafts (6, 5) to the respective trunnion shafts (4L, 4R) is made into the same construction, wherein since the link ratios of the first connection member from both left and right steering operation tools (3L (3R)) to the respective trunnion shafts (4L (4R)) are composed to be roughly identical to each other, steering operation feeling can be made the same. In addition, since the second connection members can be made the same, the second connection members can be made for common use.

A third aspect of the invention is featured, in the above description, in that the above-described relay shafts (6, 5) are set upward of the positions of the two trunnion shafts (4L, 4R) respectively. Therefore, the second connection member to the trunnion shafts (4L, 4R) is constructed and disposed upward of the trunnion shafts (4L, 4R) respectively, wherein the connection mechanism from the relay shafts (6, 5) to the trunnion shafts (4L, 4R) can be constructed to be compact.

According to the invention described in the third aspect, it is possible to compactly compose the connection mechanism from the relay shafts (6, 5) to the trunnion shafts (4L, 4R).

A fourth aspect of the invention is featured, in the above description, in that the relay shafts (6, 5) are provided coaxially or close to each other. Therefore, the first connection members such as rods (37L, 37R) from the left and right steering operation tools (3L, 3R) to the relay shafts (6, 5) can be constructed to be roughly of the same length, wherein the link ratio can be composed to be roughly the same at the left and right sides.

According to the invention described in the fourth aspect, it is possible that the first connection members such as the rods (37L, 37R) from the left/right steering operation tools (3L, 3R) to the relay shafts (6, 5) is constructed to be roughly of the same length, wherein the link ratios can be composed to be roughly same at both left and right sides.

A fifth aspect of the invention is featured, in the above description, in that the forward drive side operating direction of one trunnion shaft (4L) and the forward drive side operating direction of the other trunnion shaft (4R) are established in opposite directions to each other. Therefore, with such a construction, the first connection members such as rods (37L, 37R) between the left and right steering operation tools (3L, 3R) and the relay shafts (6, 5) are provided so that the relay shafts (6, 5) are caused to reversely turn relatively, wherein it becomes easy to set the link ratios, and the forward drive operating side of the left and right steering operation tools (3L, 3R) is set in the same direction and it is possible to make the steering operation feeling identical to each other at both left and right sides.

According to the invention described in the fifth aspect, since the first connection members such as the rods (37L, 37R) between the left/right steering operation tools (3L, 3R) and the relay shafts (6, 5) are interlocked and connected so that the relay shafts (6, 5) are caused to reversely turn relatively, it becomes easy to set the link ratios, the forward drive operating side of the left and right steering operation tools (3L, 3R) are established in the same direction, and steering operation feeling can be made the same at both left and right sides. In addition, when carrying out a forward drive operation, the respective rods (37L (37R)) and (40L (40R)) of the first connection member and the trunnion shaft operating arms (38L (38R)) of the second connection member are operated in the pulling direction, and when carrying out a reverse drive operation, the respective rods (37L (37R)) and (40L (40R)) and the trunnion shaft operating arms (38L (38R)) are set in the pushing direction. Therefore, for example, when operating both the left and right steering levers (3L, 3R) in the forward drive operating side, there is no case where the steering operation feeling differs from each other in comparison with such a construction as the pushing and pulling directions of the respective connection mechanisms differ from each other. Therefore, maneuverability thereof is satisfactory.

A sixth aspect of the invention is featured, in the above description, in that the forward drive side operating direction of one trunnion shaft (4L') and the forward drive side operating direction of the other trunnion shaft (4R') are, respectively, established in the same direction. With such a construction, since the first connection members such as rods (37L', 37R') between the left/right steering operation tools (3L', 3R') and the relay shafts (6', 5') are interlocked and connected with each other so that the relay shafts (6', 5') are turned in the same direction at the forward drive operating side (or reverse drive side), wherein it is easy to set the link ratios.

According to the invention described in the sixth aspect, the first connection members such as the rods (37L', 37R') between the left/right steering operation tools (3L', 3R') and the relay shafts (6', 5') are interlocked and connected so that the relay shafts (6', 5') are turned in the same direction at the forward drive side (or the reverse drive side), wherein it is easy to set the link ratios. Further, since the trunnion shafts (4L', 4R') of the respective hydraulic pumps (PL', PR') are set to be parallel to each other, and the rotation direction at the forward drive operating side and that at the reverse drive operating side are, respectively, set in the same direction, checking of the assembly work can be facilitated in interlock with motions of the left and right steering operation tools (3L', 3R') which are respectively driven.

According to the first aspect through the sixth aspect of the invention, since the HST hydraulic pumps (PL (PL'), PR (PR')) are disposed forward and backward at one left or right side of the vehicle, assembling work and maintenance of the HST hydraulic pumps (PL (PL'), PR (PR')) can be facilitated.

BRIEF DESCRIPTION OF THE DRAWINGS

FIGS. 9(A) is a plan view showing a mower, and (B) is a side view of the mower;

FIGS. 11(A) and (B) are sectional views showing actions of the steering lever and trunnion shaft according to a different embodiment;

DETAILED DESCRIPTION OF THE PREFERRED EMBODIMENTS

Figure 1:
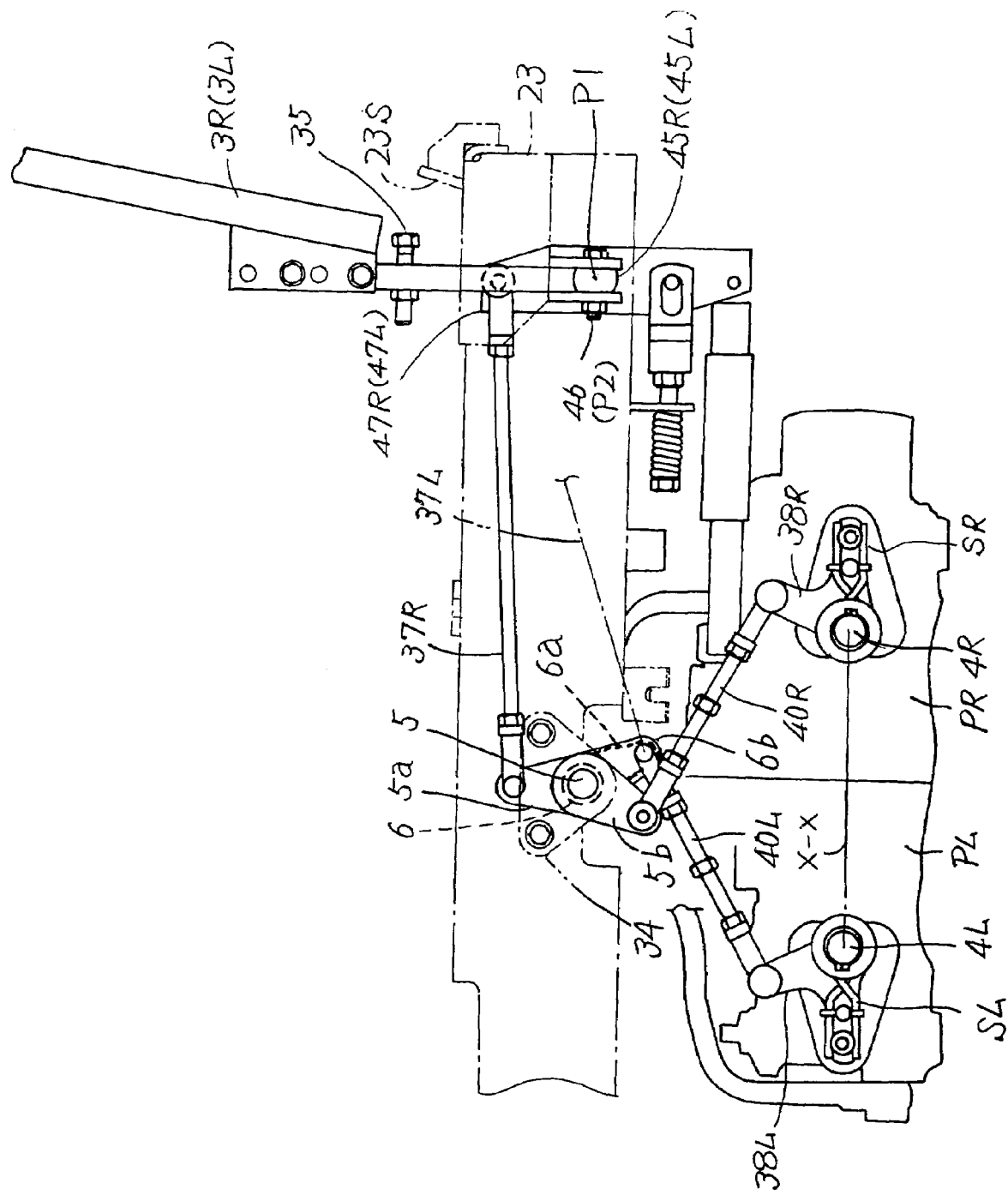
FIG. 1 is a side view showing a link mechanism between a steering lever and a trunnion shaft.

Hereinafter, based on the drawings, a description is given of a mode in which the present invention is employed in a mid-mount type riding mower.

First, a description is given of the entire configuration of a riding mower 10.

The riding mower 10 is provided with front lower frames 11, 11 at the left and right of the front thereof as shown in FIG. 3 through FIG. 6, rear lower frames 12, 12 are connected to the front lower frames 11, 11, and the front and rear lower frames 11 and 12 at the left and right sides are connected to each other by horizontal frames 13, 13 in the cross direction, thereby constructing a vehicle body frame. And a pair of left and right caster type front wheels 14, 14 are provided at the left and right of the front end portion of the front lower frames 11, 11, and rear wheels 1L, 1R operating as a pair of left and right drive wheels are provided at the left and right side of the intermediate portion of the rear lower frames 12, 12. Link arms 15f, 15r are supported at the front part and rear part of the above-described front lower frames 11, 11, respectively, and a mower 9 attached to the vehicle belly is elevated and lowered by expansion and contraction of an elevational cylinder 55.

Figure 5:
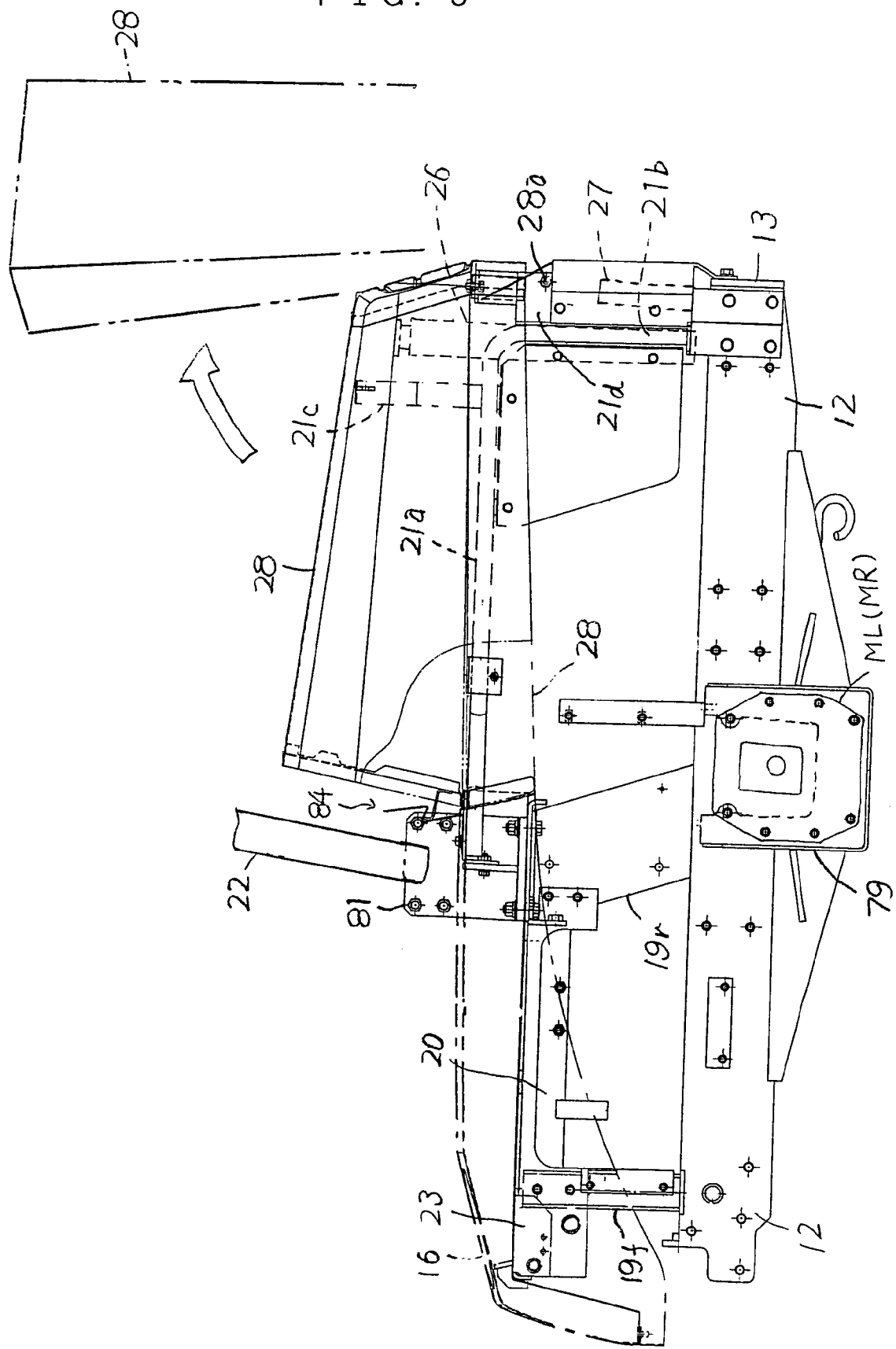
FIG. 5 is a side view showing a rear frame and its surroundings.

As shown in FIG. 5, fender supporting frames 20 are supported in parallel to each other via the front and rear longitudinal frames 19f and 19r between the above-described left and right rear lower frames 12 and 12, wherein a pair of left and right frames 20 are provided. A connection frame 21 is suspended between the left and right frames 20, 20, thereby supporting a seat floor. Further, steering lever supporting plates 23, 23 are provided at the front part of the respective frames 20, 20, thereby supporting the left and right steering levers 3L, 3R. In addition, it is constructed that a safety frame 22, which is gate-shaped in its front view and covers the upper rear part of the control seat 2, is erected at the rear part of the frames 20, 20.

Figure 3:
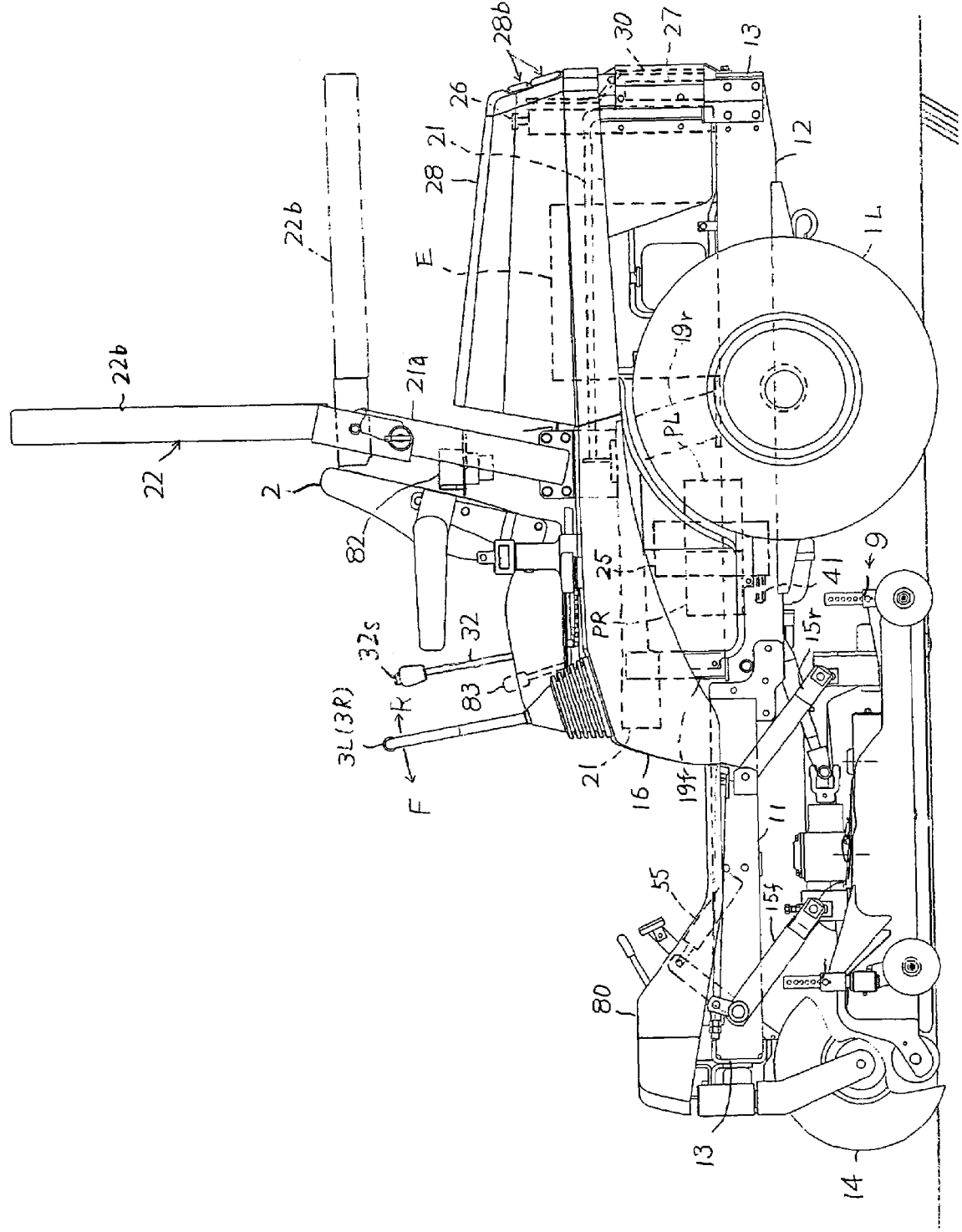
FIG. 3 is an entire side view of a riding mower.
Figure 4:
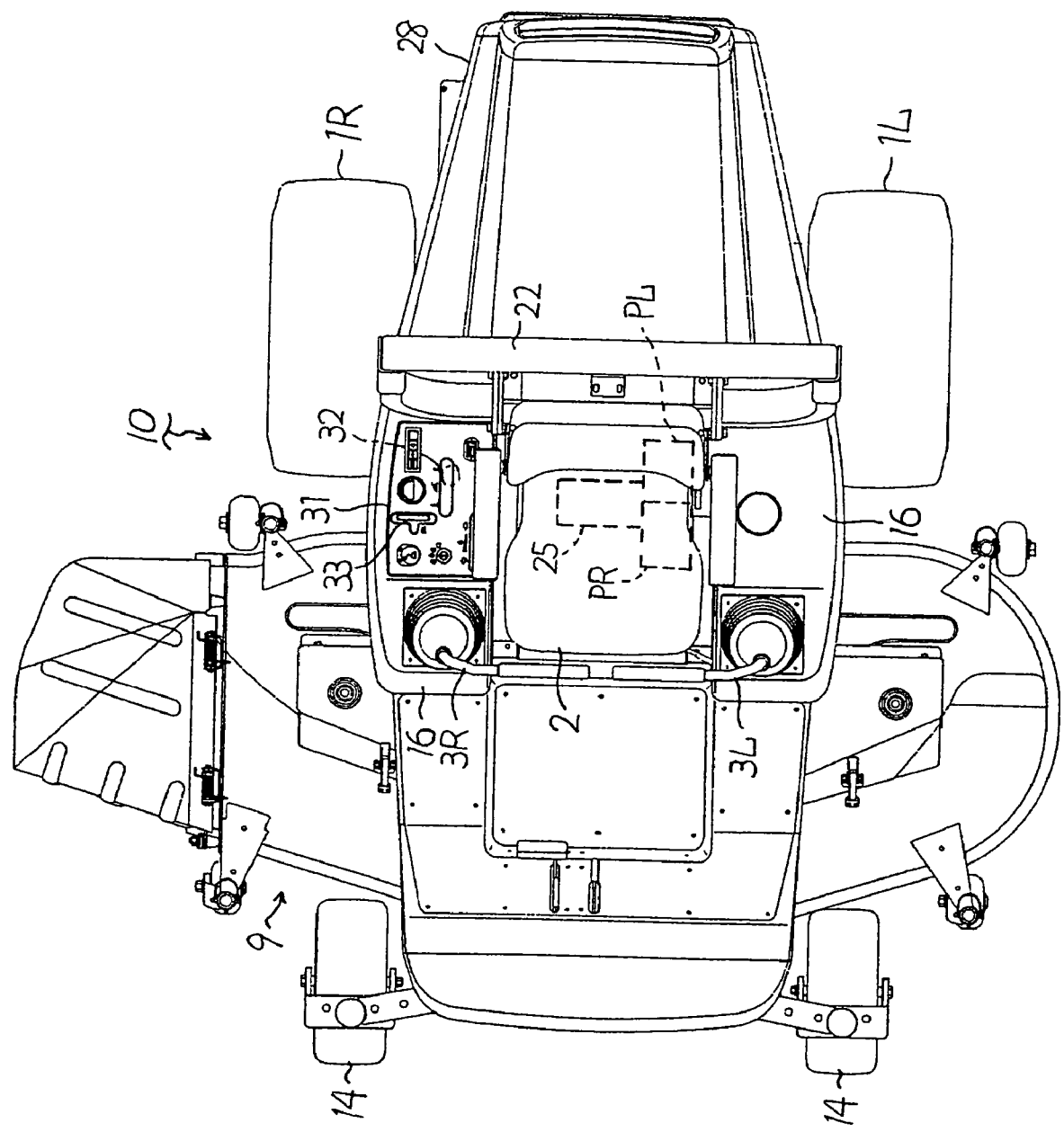
FIG. 4 is an entire plan view of the riding mower.

Also, as shown in FIG. 1 and FIG. 3, a transmission case 25 which integrally composes a pair of HST hydraulic pumps PL and PR is supported between the above-described left and right rear lower frames 12 and 12, and at the same time, the base part of the above-described safety frame 22 and the rear end part of the rear frame 12 are connected to each other by means of a reinforcement frame 21 at the rear end part of the above-described upper frame 20, wherein the rear part of the fender 16 is attached on the same frame 21 in a mounted state.

Further, an engine E, a radiator 26 and an oil cooler 27 are supported between the above-described left and right rear frames 12 and 12 in order from the front part. The rearward part of the radiator 26 and oil cooler 27 is covered by a bendable dust-proof net 30, and the surrounding parts thereof and the engine E are covered by a bonnet 28.

Figure 6:
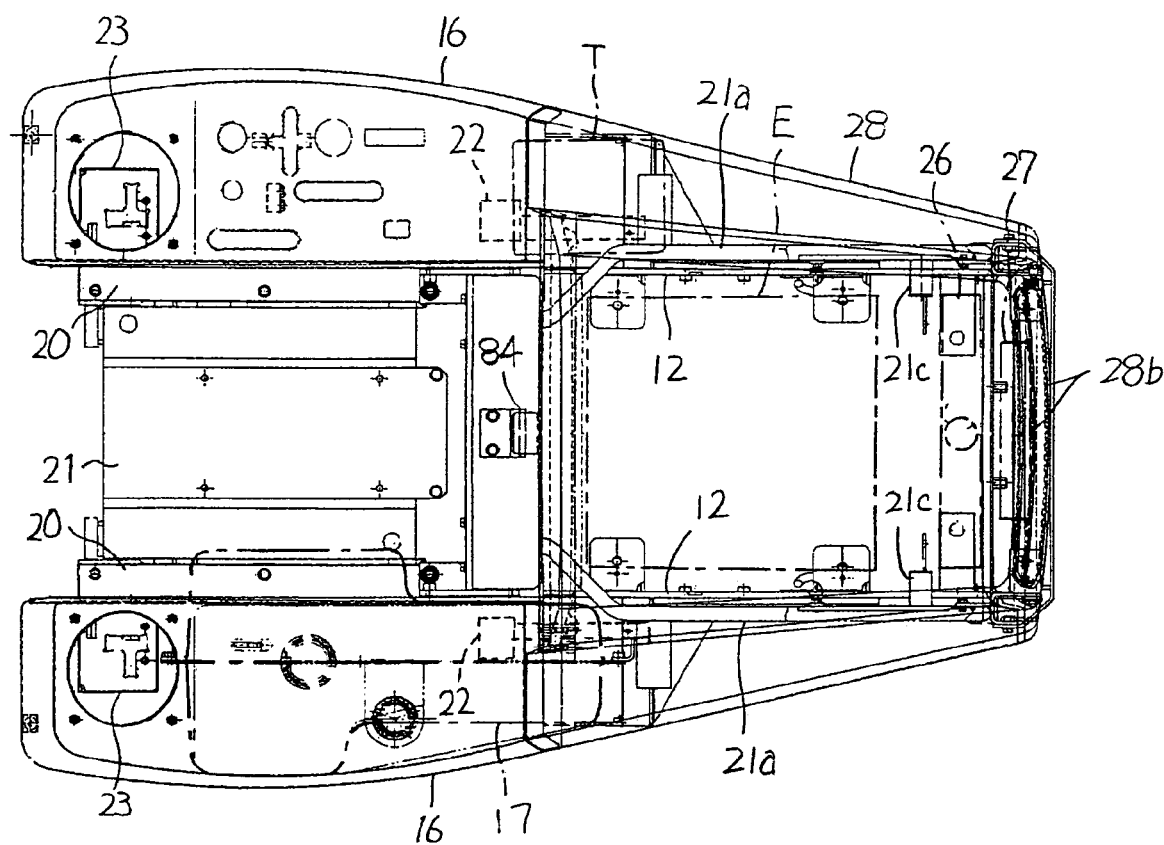
FIG. 6 is a plan view showing the rear frame and its surroundings.

Also, reference symbols ML and MR in FIG. 5 respectively denote an HST hydraulic motor attached to the respective left and right rear frames 12, 12, reference symbol T in FIG. 6 denotes an working oil tank supported on the rear lower frame 12 at the right side, and reference number 17 denotes a fuel tank supported by means of the left side upper frame 20 and the rear lower frame 12.

In addition, as shown in FIG. 3, an operation panel 31 is provided on the right side fender 16 of the above-described control seat 2, and an elevation lever 32 for operating the height of the mower 9 is provided on the operation panel 31 so as to protrude therefrom, and the operation panel 31 is composed to be provided with a height adjusting dial 33 for adjusting the mowing height of the mower 9 and various types of displays. In addition, a PTO ON/OFF switch 32s is provided at the tip end of the grip of the above-described elevation lever 32, by which drive of the mowing blades of the mower 9 is turned on and off.

Next, a description is given of a supporting structure of the above-described steering levers 3L, 3R which are steering operation tools.

Figure 7:
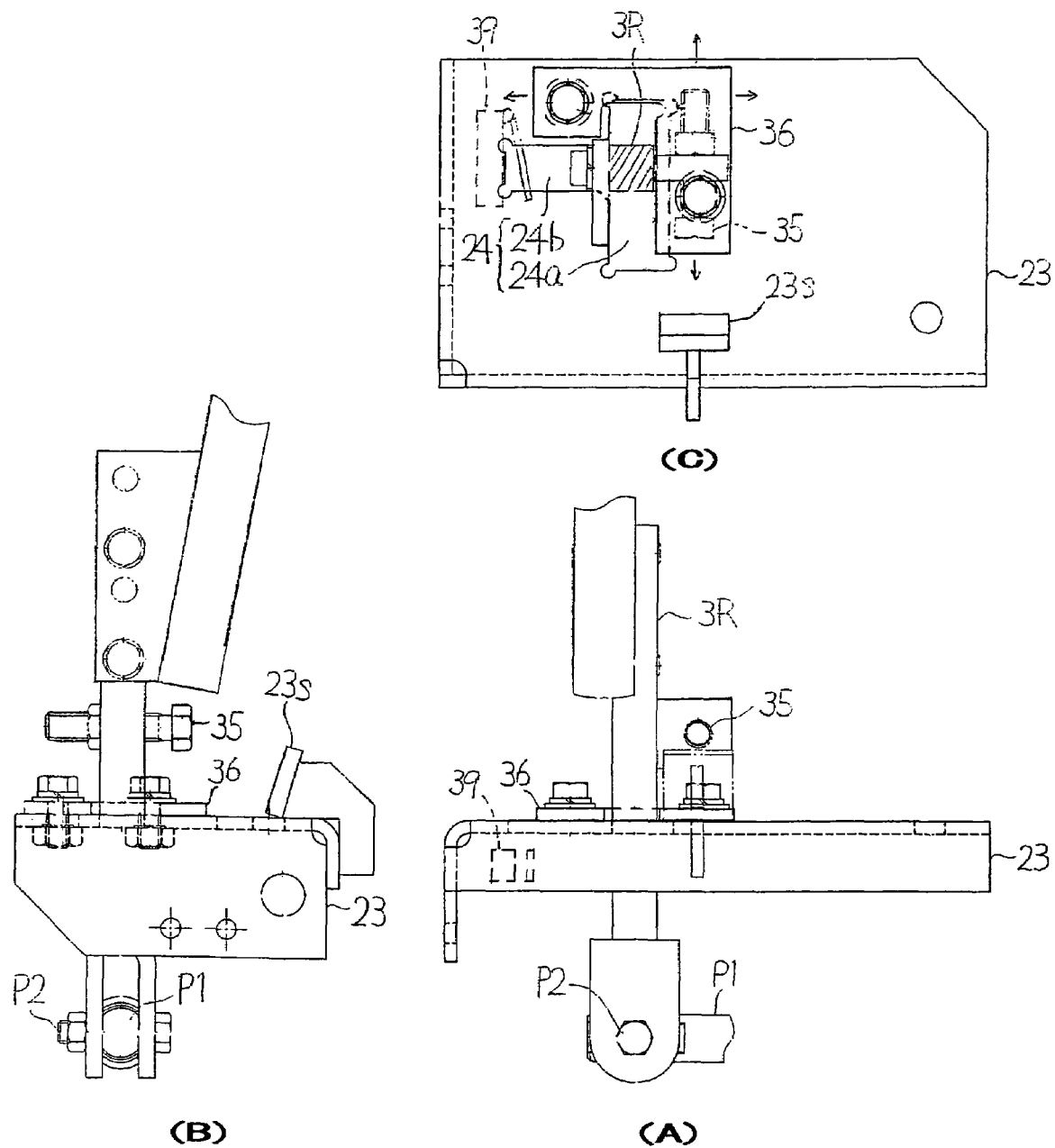
FIGS. 7(A) is a front view showing the base part of the steering lever, (B) is a side view showing the base part of the steering lever, and (C) is a plan view showing the base part of the steering lever.

The above-described steering lever supporting plate 23 is, as shown in FIG. 7, constructed so that the supporting plate 23 is cut open for a lever guide 24 consisting of the drive and rear guiding portion 24a in the longitudinal direction and a left and right guiding portion 24b for guiding from the center portion of the drive and rear guiding portion 24a, that is, the neutral position, to the left and right outward, causes turning shafts 45L, 45R, which are supported from the upper frame 20 side downward of the above-described plate 23 in the cross direction and have an axial center P1 in the cross direction, to protrude so as to correspond to the left and right steering levers 3L, 3R, causes a bolt (hereinafter called forward and rearward turning shafts 46, 46) of the axial center P2 in the longitudinal direction to pass through the same shafts 45L, 45R, and supports the base part of the steering lever 3R rotatably forward and rearward or leftward and rightward along the above-described lever guide 24.

In addition, it is constructed that a stopper bolt 35 is attached to the base part of the steering lever 3R so that the protrusion length thereof is adjustable, and by varying the distance to a stopper piece 23s on the plate 23, the forward and rearward stroke of the lever is adjusted.

It is constructed that a regulation plate 36 which is like an inverted L in its plan view is bolted to the inside and rear side of the lever guide 24 movably in the forward, rearward, leftward and rightward directions. The regulating plate 36 regulates play of the lever arm 3R inserted in the lever guide 24 in the forward, rearward, leftward and rightward directions by means of a single member. Also, the regulation plate 36 regulates the forward and reverse drive speed of the left and right rear wheels 1L, 1R to a determined speed in response to respective vehicles and brings about safe travelling. In addition, since it is possible to prevent excessive quick turns at a high speed such as a so-called spin turn in which a rear wheel 1 inside a swivel turn is reversed, and a pivot turn by which the same rear wheel 1 is stopped, it is possible to prevent a lawn from being damaged.

A neutral detection switch 39 which is turned on when the above-described steering levers 3L, 3R are operated to the neutral position is provided at the base of the steering levers 3L, 3R. It is constructed that rotation of the PTO shaft 41 is cut off when the same neutral detection switch 39 is turned on, whereby there becomes no case where the mower 9 is driven during stop, and safety in maintenance can be improved.

Also, the above-described vehicle type mower 10 is constructed so that rotation of the PTO shaft 41 can be turned on and the mower 9 can be driven only when the above-described PTO shaft ON/OFF switch 32s is turned on and a seat switch downward of the seat for detecting seating of an operator, which is separately provided, is turned on.

Next, a description is given of an interlocking mechanism of the above-described left and right steering levers 3L, 3R and HST hydraulic pumps PL and PR for the left and right rear wheels 1L, 1R operating as drive wheels.

Figure 2:
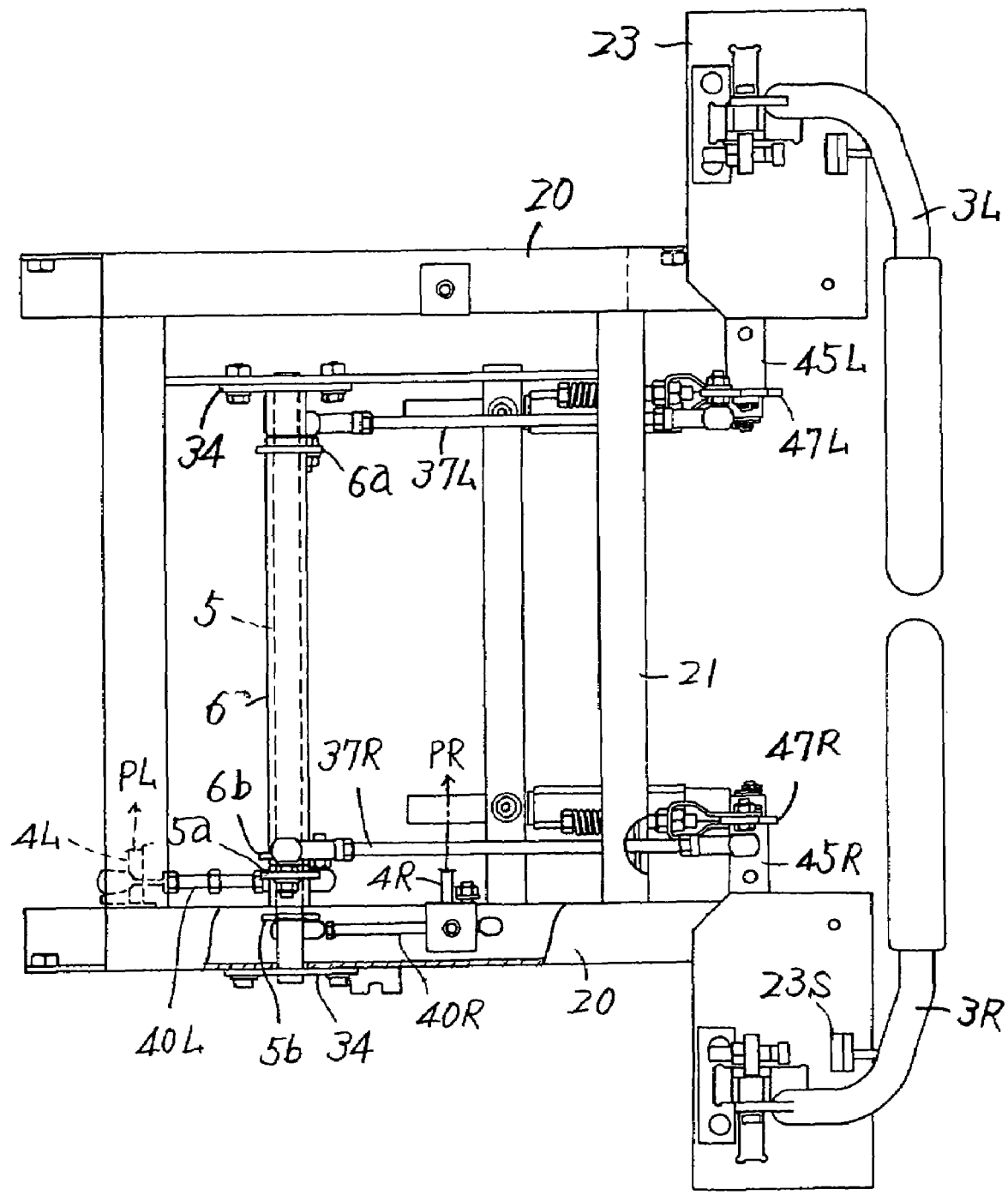
FIG. 2 is a plan view showing a link mechanism between the steering lever and the trunnion shaft.

As shown in FIG. 1 and FIG. 2, a HST pump PR for driving the right rear wheel is provided at the front side at one side portion of the transmission case 25, and the HST pump PL for driving the left rear wheel is provided at the rear portion thereof, wherein the respective trunnion shafts 4L, 4R are provided so as to protrude outward in parallel to each other, and torque springs SL, SR which become pressing means are wound on the trunnion shafts 4L, 4R, wherein the trunnion shafts 4L, 4R are pressed so as to be returned to the neutral position (state shown in FIG. 1).

A plate 29 is supported inside the left upper frame 20 in parallel thereto. A rotation shaft (relay shaft) 5 in the cross direction is rotatably supported between the plate 29 and the right upper frame 20 by means of brackets 34, 34, and a cylindrical shaft (relay shaft) 6 is rotatably supported to be coaxial with the first rotation shaft 5.

Further, the rotation shaft 5 and cylindrical shaft 6 are constructed in the side view thereof so that the shafts are, respectively, set upward of roughly the central position C of a segment (X-X) connecting the trunnion shafts 4L, 4R. And, it is constructed that the third swing arm 6a extending downward at the left end portion (the upper side in FIG. 2) of the cylindrical shaft 6 and the base part of the left steering lever 3L are connected to each other by a rod 37L, and the first swing arm 5a erected upward of the right end portion (the lower side in FIG. 2) of the above-described rotation shaft 5 and the base part of the right steering lever 3R are connected to each other by a rod 37R.

That is, the rotation shaft 5 and cylindrical shaft 6 are provided so as to overlap left and right fixing arms 47L, 47R erected on the left and right turning shafts 45L, 45R having a common axial center P1 of the left and right steering levers 3L, 3R in the side view. One end of the respective rods 37L, 37R is connected to the corresponding left and right fixing arms 47L, 47R, respectively. And, a connection point between the first swing arm 5a and the rod 37R and length of the rod 37R, and connection point between the third swing arm 6a and the rod 37L and length of the rod 37L are determined so that a pair of the rods 37L and 37R are made into axial symmetry with respect to a straight line connecting the connection point of the corresponding rods 37L and 37R (both are agreed with each other in the side view) and the axial centers of the relay shafts 5 and 6.

As described above, the first connection member consisting of left and right rotation shafts 45L, 45R, left and right fixing arms 47L, 47R, rods 37L, 37R, and first and third swing arms 5a, 6a is provided between the left/right steering levers 3L, 3R and the rotation shaft 5 or cylindrical shaft 6 operating as the relay shaft, wherein the left and right steering levers 3L and 3R can independently rotate the rotation shaft 5 or cylindrical shaft 6.

For this reason, the connection mechanism (the first connection member) to the relay shafts 6, 5 of the left operating lever 3L and right operating lever 3R is composed of the same link mechanism and the link ratios are made the same, wherein it becomes possible to interlock the relay shafts 5 and 6 normally or reversely with the same quantity of operation.

In addition, it is constructed that the second connection member intervenes between the rotation shaft 5 and cylindrical shaft 6, which operate as relay shafts, and the left/right trunnion shafts 4L, 4R, and rotation of the rotation shaft 5 rotates and interlocks with the trunnion shaft 4R, and rotation of the cylindrical shaft 6 rotates and interlocks with the trunnion shaft 4L.

That is, the fourth swing arm 6b which is roughly the same in shape as the third swing arm 6a at the left end portion is provided to be oriented downward at the right end portion (the lower side in FIG. 2) of the cylindrical shaft 6, and the fourth swing arm 6b is connected to the trunnion shaft operating arm 38L of the HST pump PL for driving the left rear wheel by means of the rod 40L. The second connection member for connecting the cylindrical shaft (relay shaft) 6 and the trunnion shaft 4L to each other is composed of the fourth swing arm 6b, rod 40L, and trunnion shaft operating arm 38L.

Further, the second swing arm 5b is provided so as to be oriented downward at the outside position along the axial center direction of the first swing arm 5a erected on the upper part of the rotation shaft (relay shaft) 5, and the second swing arm 5b is connected to the trunnion shaft operating arm 38R of the HST pump PR for driving right rear wheel by means of the rod 40R. The second connection member for connecting the rotation shaft (relay shaft) 5 and the trunnion shaft 4R to each other is composed of the second swing arm 5b, rod 40R and trunnion shaft operating arm 38R.

In the interlock mechanism of the left and right steering levers 3L, 3R, which is composed as described above, if the left steering lever 3L is turned forward and operated around the left and right rotation shaft 45 of the axial center P1, the operation interlocks the trunnion operating arm 38 by the first connection member and the second connection member left and right separately. That is, the rod 37L, plate piece 6a, cylindrical shaft (relay shaft) 6, fourth swing arm 6b, rod 40L, and trunnion operating arm 38L are interlocked, and the trunnion shaft 4L of the HST pump PL for driving the left rear wheel is turned to the forward drive operating side (to the side of the arrow F), wherein the rear wheel 1L is rotated for forward drive. Also, if the left steering lever 3L is turned and operated rearward, the trunnion shaft 4L of the HST pump PL for driving the left rear wheel is turned to the reverse drive operating side (to the side of the arrow R) via the interlock mechanism same as above, wherein the rear wheel 1L is reversely rotated.

As shown in FIG. 1, if the right steering lever 3R is turned and operated forward around the left and right rotating shaft P1, the operation interlocks with the first swing arm 5a, rotation shaft (relay shaft) 5, second swing arm 5b, rod 40R, and trunnion operating arm 38R, and the trunnion shaft 4R of the HST pump PR for the driving right rear wheel is turned to forward drive operating side (to the side of the arrow F), wherein the right rear wheel 1R is rotated for forward drive. Also, if the right steering lever 3R is turned and operated rearward, the trunnion shaft 4R of the HST pump PR for driving the right rear wheel is turned to reverse drive operating side (to the side of the arrow R) via the interlock mechanism same as above, wherein the rear wheel 1R is reversely rotated.

As described above, the trunnion shafts 4L and 4R are juxtaposed, and the rotation directions at the forward drive operating side are established in reverse directions to each other, wherein the rotation directions at the reverse drive operating side are established in reverse directions to each other.

The rotation shaft 5 and cylindrical shaft 6 which are the relay shafts are provided horizontally in the coaxial center, and the axial center thereof is disposed above the perpendicular bisector of a segment (X-X) connecting the trunnion shaft 4L and trunnion shaft 4R, whereby the distances between the respective axial centers of the trunnion shafts 4L and 4R and the common axial center of the rotation shaft 5 and the cylindrical axis 6 are in the same relationship. The connection point between the fourth swing arm 6b and the rod 40L and connection point between the second swing arm 5b and the rod 40R are disposed in axial symmetry with respect to the perpendicular bisector. In addition, the connection point between the trunnion operating arm 38L and the rod 40L and the connection point between the trunnion operating arm 38R and the rod 40R are disposed in axial symmetry with respect to the above-described perpendicular bisector as well. Therefore, the same link structure and same link ratios are adopted between the two relay shafts 6, 5 and the trunnion shafts 4L, 4R.

And, where the riding mower 10 is driven forward, the left and right steering levers 3L, 3R are simultaneously turned and operated forward by the same stroke, and where the lawn mower 10 is moved in reverse, the left and right steering levers 3L, 3R are simultaneously turned and operated rearward by the same stroke. And, where the riding mower 10 is turned left or right, the outside steering lever is turned and operated greater than the inside steering lever in accordance with the steering radius, and when a further greater swivel is required, the inside steering lever is turned and operated rearward.

As described above, since, in the riding mower, the HST hydraulic pumps PL and PR are juxtaposed front and back at one side of the vehicle (the left side in the illustrated example), it is possible to carry out assembling work and maintenance of the same pumps PL and PR at one side of the vehicle, wherein work efficiency for disassembling and assembling is satisfactory.

Further, the link ratios of the link mechanism such as respective rods in the first connection member and the second connection member from both the left and right steering levers 3L (3R) to the respective trunnion shafts 4L (4R) become roughly the same, and operation feeling of the left and right steering levers 4L, 4R can be made the same, wherein maneuverability can be improved. In particular, in the above-described construction, when carrying out a forward drive operation, the respective rods 37L (37R), 40L (40R) and trunnion shaft operation arms 38L (38R) are operated in the pulling directions, and when carrying out a reverse drive operation, the respective rods 37L (37R), 40L (40R) and trunnion shaft operation arms 38L (38R) are operated in the pushing directions. Therefore, for example, if these left and right steering levers 3L, 3R are operated for the forward drive operating side, there is no case where the operation feeling of the levers differs from each other in comparison with a construction where the pushing and pulling directions of the respective interlock mechanisms differ from each other, wherein maneuverability thereof can be further improved (FIG. 1).

The rod 37L connected to the base part of the left steering lever 3L and the rod 37R connected to the base part of the right steering lever 3R can be composed of common components having the same length, and the rod 40L connected to the trunnion shaft 4L of the HST hydraulic pump for driving the left rear wheel and the rod 40R connected to the trunnion shaft 4R of the HST hydraulic pump PR for driving the right rear wheel can be composed of the common components having the same length, it is possible to reduce the component costs, and the link ratios to the respective left and right steering levers 3L, 3R and the trunnion shafts 4L, 4R can be made the same, wherein it becomes easy to carry out adjustment work of the link mechanisms.

Figure 8:
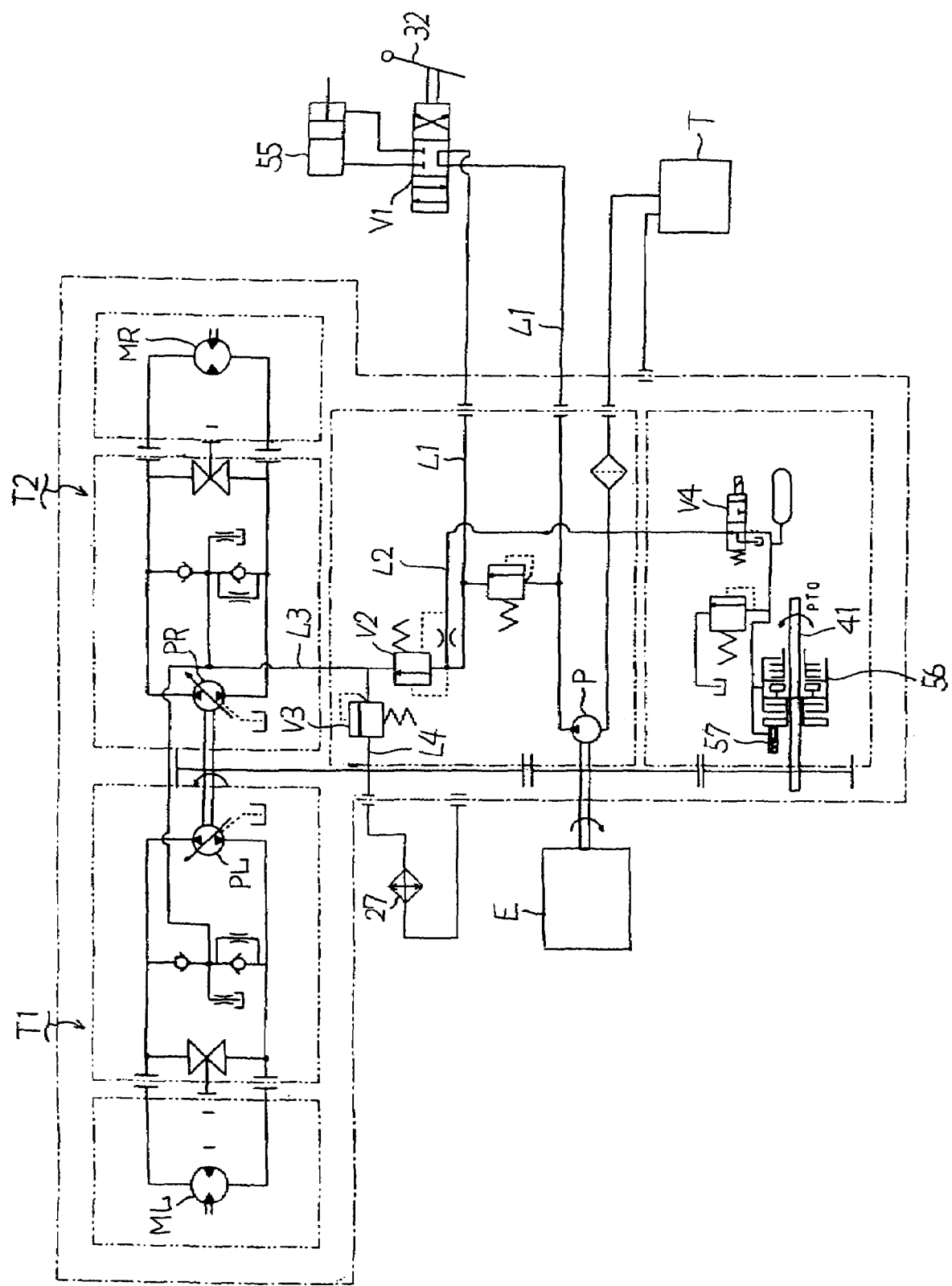
FIG. 8 is a hydraulic circuit diagram.

Next, a description is given of hydraulic circuits of the riding mower 10 on the basis of FIG. 8.

A hydraulic pump P driven by the engine E is constructed so that it sucks in working oil from the oil tank T and supplies compressed oil into a hydraulic cylinder 55 for mower elevation through the main circuit L1 via an elevation change valve V1 which is changed over by the elevation lever 32. Also, it is constructed that the compressed oil passed through the change valve V1 is sent into the PTO oil path L2 by a priority valve V2, and at the same time, surplus oil of the oil path L2 is sent into the front and rear HST circuits L3 as charge oil of the HST. A branching line L4 is provided between the priority valve V2 and the HST circuit L3, and the compressed oil is supplied into the oil cooler 27 via a relief valve V3.

It is constructed that, in the HST circuit L3, the compressed oil discharged from the HST hydraulic pump PL (PR) is received by the HST motor ML (MR), thereby rotating the output shaft, and the rear wheel 1L (1R) is driven.

In addition, the PTO oil path L2 is provided with a changeover control valve V4 for communication and interruption of the same circuit. When the seat switch and PTO switch 32s are turned on, and the neutral switch 39 is turned off, electricity is supplied, wherein a hydraulic piston 57 secured in a PTO clutch 56 is elongated to turn on the same clutch 56.

Next, a description is given of a construction of the mower 9 on the basis of FIG. 9.

The mower 9 is provided with an input case 63 roughly at the center part in the cross direction in the upper portion of the housing 60, which transmits rotation from the PTO shaft 41 via a universal joint. The rotation drives the central driven pulley 67a and the left/right driven pulleys 67b, 67c from a drive pulley 65 downward of the same case 63 via rotations of a belt 66, that is, cutters supported on the lower parts of the same pulleys 67a, 67b and 67c are driven. In addition, a discharge port for discharging mowed turf and grass is cut open at one side portion of the housing 60, and a cover 69 is vertically and rotatably supported around the discharge port. Also, hand grips 71, 71 formed of a bent pipe-shaped frame are provided at both left and right sides of the rear part of the housing 60. Thereby, when carrying out maintenance of the mower 9, it is possible to easily draw out the mower 9 from downward at both left and right sides of the riding mower 10.

Figure 10:
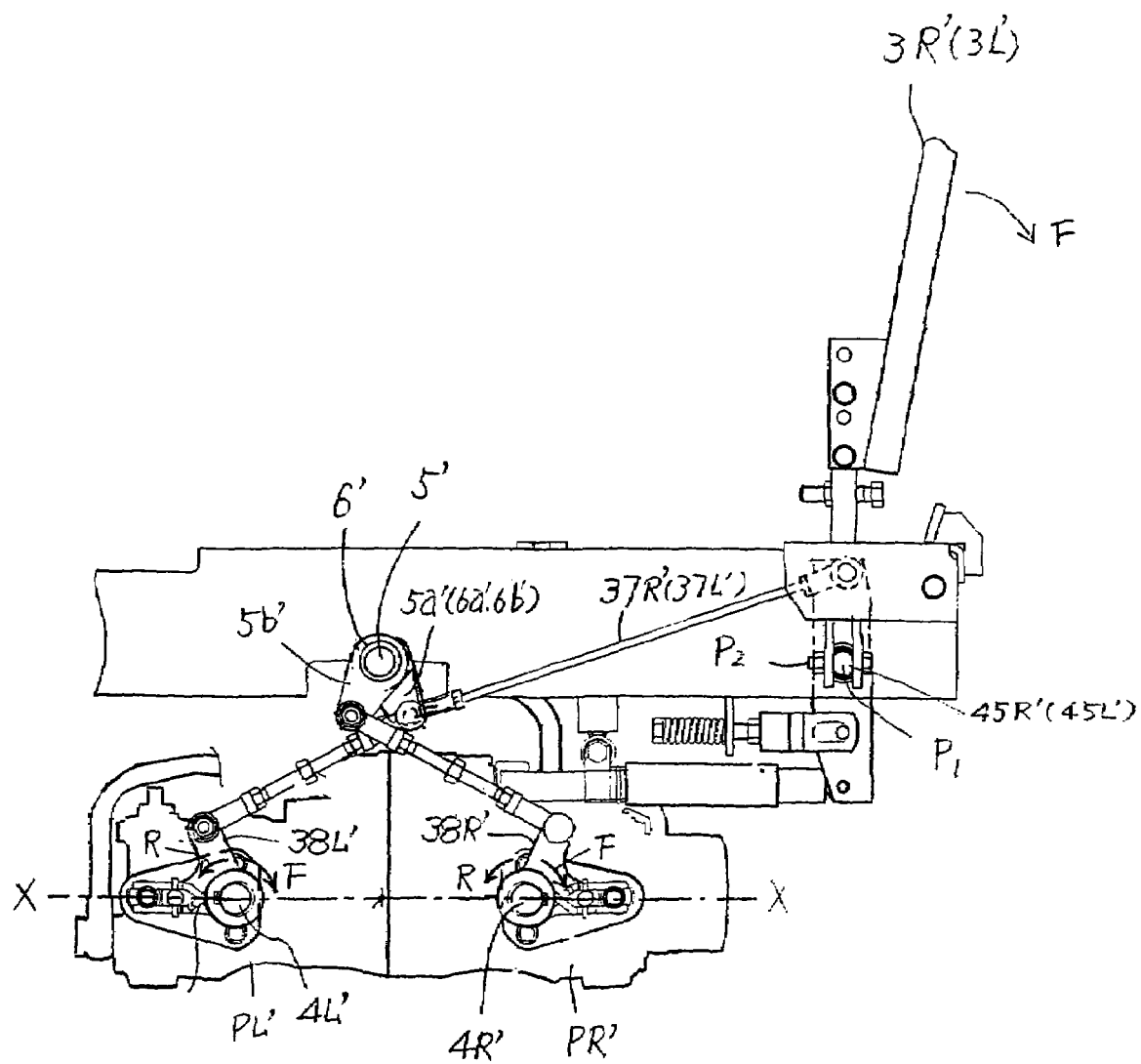
FIG. 10 is a side view showing a link mechanism between a steering lever and a trunnion shaft according to another embodiment.

FIG. 10 and FIG. 11 show a different example of the interlock mechanism of the left/right steering levers 3L, 3R and HST hydraulic pumps PL, PR. In the example shown in FIG. 1 and FIG. 2, forward drive and reverse drive are carried out by rotations of the trunnion shafts 4L, 4R. However, the hydraulic pumps PL, PR and the trunnion shafts 4L, 4R thereof are established so that the trunnion shafts 4L, 4R are reversely rotated at the forward drive operating side in the side view. However, in the example shown in FIG. 10 and FIG. 11, the hydraulic pumps PL', PR' are established so that the trunnion shaft 4L' and trunnion shaft 4R' are rotated in the same direction at the forward drive operating side. A description is given of an interlock mechanism from the above-described left/right steering levers 3L', 3R' to the HST hydraulic pumps PL', PR' at this time.

A rotation shaft (first rotation shaft) 5' in the cross direction, which is similar to the construction of FIG. 1, is provided, and a cylindrical shaft (second rotation shaft) 6' is rotatably supported on the rotation shaft 5', and the rotation shaft 5' and cylindrical shaft 6' are constructed in the side view thereof so that the shafts are, respectively, set upward of roughly the central position C of a segment (X-X) connecting the trunnion shafts 4L', 4R'. And, a plate piece (third swing arm) 6a' extending downward at the left end portion (the lower side in FIG. 10) of the cylindrical shaft 6' and the base part of the left steering lever 3L' are connected to each other via the rod 37L', and the plate piece (first swing arm) 5a' secured downward of the right end portion (the lower side in FIG. 10) of the rotation shaft 5' and the base part of the right steering lever 3R' are connected to each other via the rod 37R'. Also, reference symbol ' shows points differing from those in FIG. 1 and FIG. 2 (This is the same in the following description).

Also, a plate piece 6b' (fourth swing arm) having roughly the same shape as that of the plate piece 6a' at the left end portion is provided below the right end portion (the upper side in FIG. 10) of the cylindrical shaft 6', wherein the plate piece 6b' and the trunnion shaft operating arm 38L' of the HST hydraulic pump PL' for driving the left rear wheel are connected to each other by means of the rod 40L'.

A plate piece 5b' (second swing arm) is provided below the lower part of the rotation shaft 5' outside the plate piece 5a' secured downward of the rotation shaft 5a', wherein the plate piece 5b' and the trunnion shaft operating arm 38R' of the HST pump PR' for driving the right rear wheel are connected to each other by means of the rod 40R'.

In the interlock mechanism of the left and right steering levers 3L', 3R', which is constructed as described above, if the left steering lever 3L' is turned and operated forward around the left/right rotation shaft P1, the operation is interlocked with the rod 37L', plate piece 6a', cylindrical shaft 6', plate piece 6b', rod 40L', and trunnion operation arm 38L', and rotates the trunnion shaft 4L' of the HST pump PL' for driving the left rear wheel for forward drive operating side (to the side of the arrow F), thereby normally driving the left rear wheel 1L. Also, if the left steering lever 3L' is turned and operated rearward, the trunnion shaft 4L' of the HST pump PL' for driving the left rear wheel is rotated for the reverse drive operating side (to the side of the arrow R), thereby reversely rotating the left rear wheel 1L.

Also, if the right steering lever 3R' is turned and operated forward around the left/right rotation shaft P1, the operation turns and interlocks with the trunnion shaft 4R' of the HST pump PR' for driving the right rear wheel for the forward drive operating side via the rod 37R', plate piece 5a', rotation shaft 5', plate piece 5b', rod 40R', and trunnion operating arm 38R', that is, turns and interlocks therewith in the same rotation direction (to the side of the arrow F) as the forward drive side operation of the trunnion operating arm 38L', thereby causing the right rear wheel 1R to rotate normally. Also, if the right steering lever 3R' is turned and operated rearward, the trunnion shaft 4R' of the HST pump PR' for driving the right rear wheel is rotated for the reverse drive operating side (to the side of the arrow R) via the interlock mechanism the same as above, thereby causing the right rear wheel 1R to rotate reversely.

As described above, the trunnion shaft 4L' and trunnion shaft 4R' are juxtaposed to each other, wherein the rotation directions at the forward drive operating side are set in the same direction, respectively. Therefore, the rotation directions at the reverse drive operating side are also set in the same direction.

The rotation shaft 5' and cylindrical shaft 6' are coaxially provided in the horizontal direction. The axial center is disposed above the perpendicular bisector of a segment connecting the trunnion shaft 4L' and the trunnion shaft 4R' to each other. Further, the connection point of the plate piece 6b' and rod 40L' and the connection point of the plate piece 5b' and rod 40R' are made into axial symmetry with respect to the perpendicular bisector. In addition, the connection point of the trunnion operating arm 38L' and rod 40L' and the connection point of the trunnion operating arm 38R' and rod 40R' are made into axial symmetry with respect to the perpendicular bisector.

And, as in the embodiment shown in FIG. 1 and FIG. 2, where the riding mower 10 is driven forward, the left and right steering levers 3L', 3R' are simultaneously turned and operated forward by the same stroke, where the mower 10 is moved in reverse, the left and right steering levers 3L', 3R' are simultaneously turned and operated rearward by the same stroke. And, where the riding mower 10 is steered leftward or rightward, the outside steering lever is further turned and operated than the inside steering lever in accordance with the steering radius, and when a further greater swivel is required, the inside steering lever is turned and operated rearward. The link ratios of the link mechanism from both left and right steering levers 3L' (3R') to the respective trunnion shafts 4L' (4R') can be set to roughly the same, wherein the operation feeling of the left and right steering levers 3L', 3R' can be made the same, and maneuverability thereof can be improved.

Next, a description is given of a vehicle body frame structure of a riding mower having an engine incorporated in the rear part of the body.

Conventionally, in a so-called mid-mount type riding mower in which mowers are mounted between the front and rear wheels, such a construction has been known, in which an engine and a radiator are mounted in the rear part of the vehicle body, and these are covered with a bonnet (Japanese Published Unexamined Patent Application No. 2000-71790).

However, in the above-described prior art riding mower, if the lawn mower is constructed so as to be provided with various types of accessories, such as a collector and a cabin, an engine having higher horsepower is required. In addition thereto, if a number of air suction ports, in other words, an air suction portion having a wide area is provided in the bonnet, the strength may become short and may be deformed, or in order to prevent this, it is necessary that the bonnet is made of a thicker iron plate, wherein there is a problem in that the production cost is increased.

In order to solve the above-described problems, in the constructions shown in FIGS. 3, 5, 6, and 13, the following technical means are provided. In a riding mower in which a pair of left and right rear lower part frames 12, 12 disposed in the longitudinal direction are provided at the rear part of a vehicle body, an engine E and a radiator 26 are provided between the left and right rear lower part frames 12, 12, and, at the same time, the upper part, side part and rear parts of the engine E and radiator 26 are covered with a bonnet 28 equipped with ventilation portions 28b, 28b, such a construction is employed in which frames 19f and 19r in the upper and lower direction are erected at the front part of the left and right rear lower part frames 12, 12, and a fender supporting frame 20 for supporting the rear wheel fender 16 is juxtaposed, simultaneously the rear part of the fender supporting frame 20 and the rear end part of the lower part frame 12a are connected to each other by a connection frame 21, and the rear side of the top plate portion of the bonnet 28 is placed and supported on the connection frame 21.

In the riding mower constructed as described above, the engine E and radiator 26 are supported between the lower part frames 12a, 12a, and the bonnet 28 for covering these components, in particular, the rear side of the top plate portion is supported by the connection frame 21 by which the rear part of the fender supporting frame 20 and the rear end portion of the lower part frame 12a are connected to each other.

Accordingly, in the above-described riding mower, it is possible to reinforce the vehicle frame by means of the connection frame 21. Further, in order to mount and support the rear side of the top plate portion of the bonnet 28, even if the bonnet 28 is provided with ventilation portions 28b, 28b having a wide area, it is possible to support the bonnet 28 by means of inexpensive members while preventing the bonnet 28 from being deformed.

Such a construction is employed, in which the lower part frame is composed of a rear lower part frame 12 and a front lower frame 11, the HST motor supporting bracket 79 is integrally constructed at the outer side portion of the rear lower part frame 12, the engine E is mounted between the left and right rear lower part frames 12, 12, and rearward of the axle of the rear wheels 1L, 1R in the side view via a mount rubber, and further, the radiator 26 is supported rearward thereof via a plate member. Still further, the bonnet 28 covers above the engine E and radiator 26, and sideward and rearward thereof. Also, the rear face of the bonnet 28 is provided with a plurality of ventilation holes (hereinafter called air suction portions 28b, 28b) communicating with the engine room in the bonnet 28.

In addition, vertical frames 19f and 19r disposed in the vertical direction are erected at two points at the front end portions of the left and right rear lower part frames 12, 12 and the upper end portions of the front and rear vertical frames 19f, 19r are connected to each other by the fender supporting frame 20 in the longitudinal direction. Further, the left and right flames 20, 20 are connected to each other by means of a plate member, thereby supporting the control seat 2 (FIG. 5).

Also, a floor 80 is provided from downward to forward of the control seat 2, and the mower 9 is elevatably provided by means of an elevation link mechanism downward of the floor 80 and between the front wheels 14, 14 and the rear wheels 1L, 1R. Further, power is picked up from the PTO shaft 41 protruding from the front face part of the transmission case 25 and is transmitted to the mower 9.

Also, the left and right fender supporting frame 20 includes a lever guide portion 23 at its front part thereof and a ROPS (Rollover Protective Structure) supporting bracket 81 at its rear part thereof. A ROPS 22 for covering above and behind the head of an operator is fixed by bolts and nuts at the rear part of the ROPS supporting bracket 81. The ROPS 22 is composed of left and right lower part ROPS 22a, 22a and a gate-shaped upper part ROPS 22b in its front elevational view. And, the ROPS is constructed so that the lower end portion of the upper part ROPS 22b is axially supported so as to turn forward and rearward on the upper end portion of the left and right lower part ROPS 22a, 22a, and so that the upper part ROPS 22b is fixed so as to protrude upward and be turned rearward. In addition, the above-described ROPS 22a is internally provided with a cup holder 82, which holds refreshing beverages are held, rearward of the elbow rest of the control seat 2.

Also, the left and right travelling speed changing levers 3L, 3R for operating to change the speed of the left and right hydrostatic transmissions T1, T2 are provided on the left and right fender supporting frames 20, 20 so that the levers can be turned. Further, a throttle lever 83 and a lift lever 32 are provided on the right fender supporting frame 20.

Figure 12:
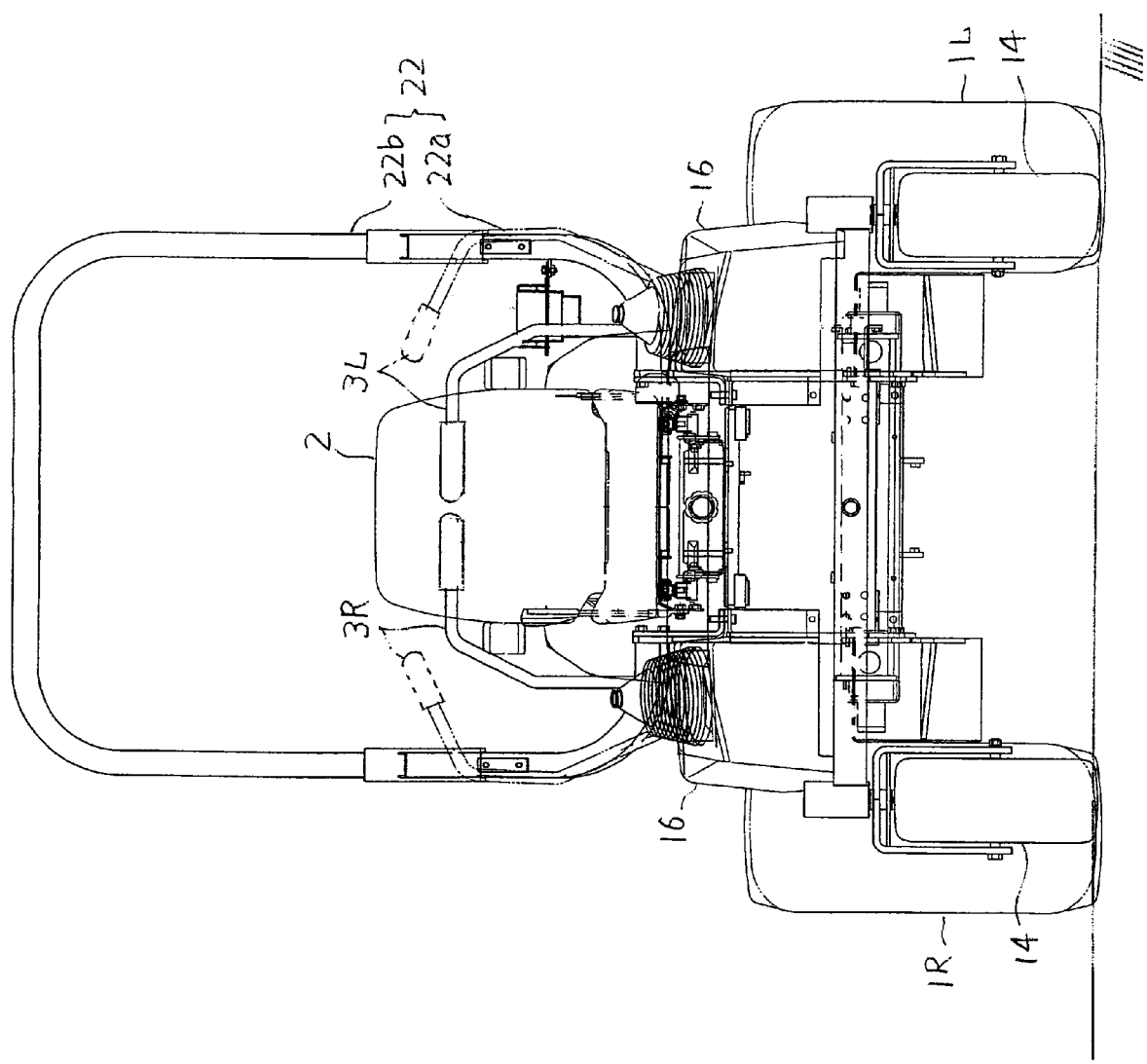
FIG. 12 is a front view showing a riding mower.
Figure 13:
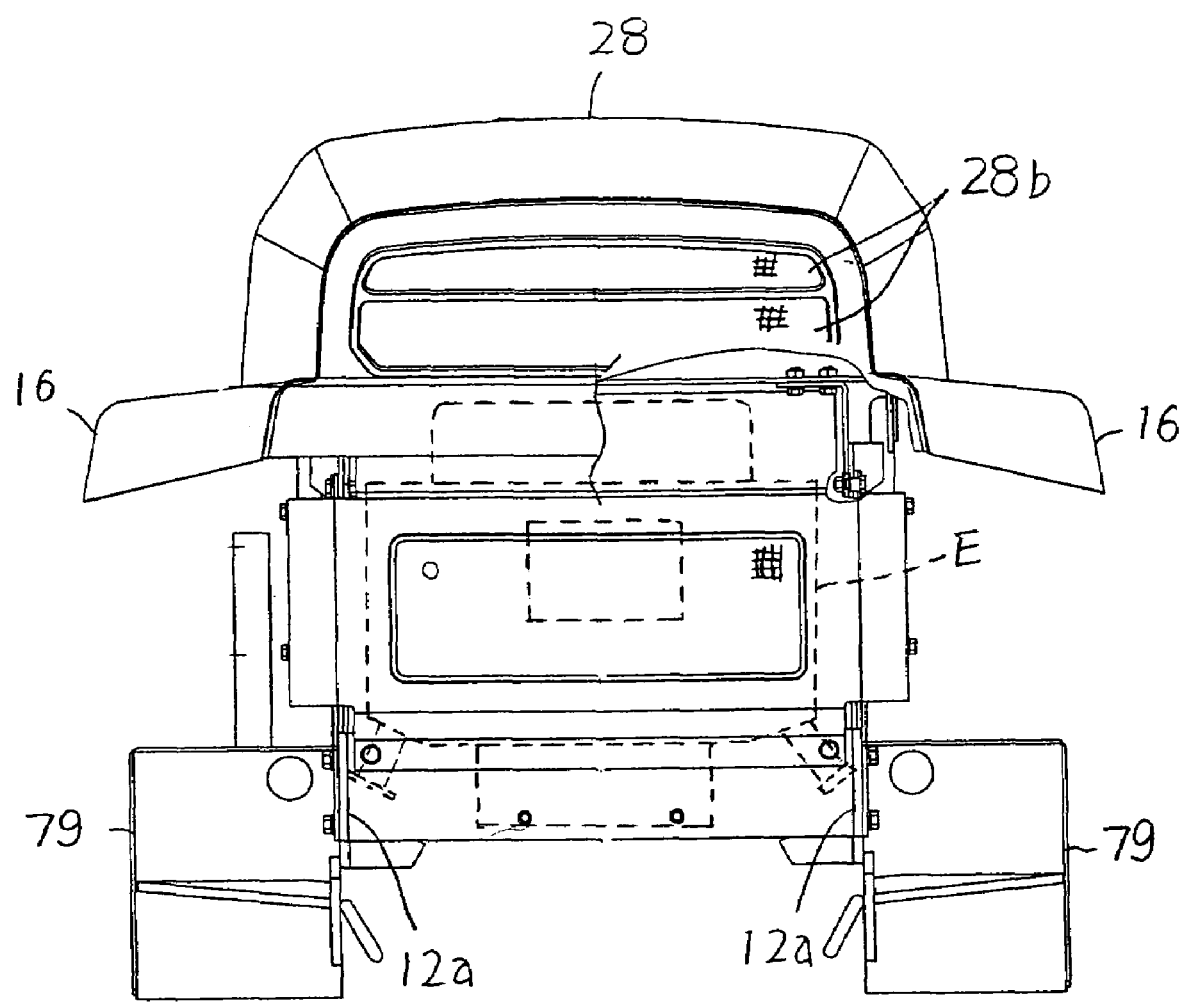
FIG. 13 is a rear view showing the rear portion of the riding mower.

The left and right travelling speed changing levers 3L, 3R are constructed so that the levers are distributed to each of the left and right sides of the control seat 2, and the left and right levers 3L, 3R are moved for a speed change from the neutral position N to the forward drive variable speed position (to the side of the arrow F) at the front side and to the reverse drive variable speed position (to the side of the arrow R) at the rear side. And, the left and right rear wheels 1L, 1R are independently rotated normally and reversely without any stage by operating the two hydrostatic transmissions T1, T2 for speed change, wherein the vehicle can be moved forward or in reverse or can be stopped. Also, the speed change levers 3L, 3R are constructed so as to be positioned at the left and right outside escape position, which is shown by hypothetical lines in FIG. 12, at the stop position, that is, the neutral position N, wherein it becomes easy for an operator to get on and off the control seat 11.

Next, a detailed description is given of a frame structure of the rear part of the riding mower body on the basis of FIG. 5 and FIG. 6.

The ROPS supporting bracket 81 for supporting the ROPS 22 is attached to the rear end part of the fender supporting frame 20 by means of bolts and nuts and is composed to be integral therewith. And, the inside erecting portion of the bracket 81, and the rear end portion of the lower part frame 12b are connected to each other by the connection frame 21. In addition, the connection frame 21 is bent and constructed to be sideways-faced L-shaped in its side elevational view by means of a horizontal frame portion 21a disposed in parallel to the rearward of the fender supporting frame 20 and a vertical frame portion 21b erected upward from the rear end portion of the rear lower part frame 12. And, the front end portion of the horizontal frame portion 21a is bent to the center of the vehicle body, and the front end portion thereof is connected to the ROPS supporting bracket 81.

Further, as shown in FIG. 5 and FIG. 6, a bonnet supporting plate 21c whose upper end portion is roughly horizontally bent is provided at the rear part of the horizontal frame part 21a of the connection frame 21. The rear side of the top plate part of the bonnet 28 is placed and supported on the upper end portion of the plate 21c via a cushion rubber. In addition, a bracket 21d extending rearward is fixed at and attached to the upper part of the vertical frame part 21b, and the rotation shaft 28a of the cross direction is constructed on the same bracket 21d, wherein the bonnet 28 is supported (at the position shown by an alternate long and two short dashes line in FIG. 5) so as to turn.

Also, reference number 84 in FIG. 6 denotes a plate spring-shaped locking mechanism of the bonnet 28.

As described above, the rear end portion of the fender supporting frame 20 and the rear side end portion of the rear lower part frame 12a are connected to each other by the connection frame 21, and by placing and supporting the rear side of the top plate of the bonnet 28 on the connection frame 21 via the bonnet supporting plate 21c, it is possible to reinforce the vehicle body frame consisting of the rear lower frame 12a, upper and lower frames 19f, 19r at the front and rear side, and fender supporting frame 20. Furthermore, if the bonnet 28 is constructed so as to be provided with a number of air suction portions 28b, 28b, it is not necessary to compose the bonnet 28 with expensive thick plate members, and it is possible to inexpensively strengthen the bonnet supporting construction.

Further, as another construction of the above construction, such a construction may be employed, in which the front end portion of the connection frame 21 is directly connected to the fender supporting plate 20 instead of the construction in which the front end portion of the connection frame 21 is connected to the fender supporting frame 20 via the ROPS supporting bracket 81. Also, such a construction may be employed, in which, instead of the construction in which the bonnet 28 is supported on the connection frame 21 via the bonnet supporting plate 21c, the connection frame 21 is composed to be tall in configuration, and the bonnet 28 is directly placed and supported on the same frame 21, or a bracket is incorporated below the inside of the bonnet 28, and the connection frame 5 is directly attached to the underside of the bracket or is placed and supported on another bracket integral therewith.

The present disclosure relates to subject matter contained in Japanese Application Nos. 2004-252662, filed on Aug. 31, 2004, and 2004-298783, filed on Oct. 13, 2004, the contents of both are herein expressly incorporated by reference in their entireties.

What is claimed is:

1. A working vehicle comprising:
a first hydrostatic transmission including a first hydraulic pump, a first hydraulic motor, and a first trunnion shaft for regulating a drive speed of the first hydraulic motor by varying discharge oil pressure fed from the first hydraulic pump into the first hydraulic motor;

a second hydrostatic transmission including a second hydraulic pump set beside in the forward or rearward direction, which is an advancement direction of a vehicle, with respect to the first hydraulic pump, and provided with a second trunnion shaft for regulating a drive speed of the second hydraulic motor by varying discharge oil pressure fed from the second hydraulic motor and the second hydraulic pump into the second hydraulic motor;

a first drive wheel driven and rotated in the forward drive direction or reverse drive direction by the first hydrostatic transmission and disposed in the left direction when being faced toward the drive direction of the vehicle;

a second drive wheel driven and rotated in the forward drive direction or reverse drive direction by the second hydrostatic transmission and disposed in the right direction when being faced toward the drive direction of the vehicle;

a first steering operating tool and a second steering operating tool each disposed in the cross direction, when being faced toward the drive direction of the vehicle, in order to independently operate the first and second trunnion shafts, respectively;

a first relay shaft and a second relay shaft provided between the first and second trunnion shafts;

first connection members for connecting the first steering operating tool and the first relay shaft with each other;

second connection members for connecting the first relay shaft and the first trunnion shaft with each other;

third connection members for connecting the second steering operating tool and the second relay shaft with each other; and fourth connection members for connecting the second relay shaft and the second trunnion shaft-with each other.

2. The working vehicle according to claim 1, wherein the first and second relay shafts driven and rotated in response to respective operations of the first and second steering operating tools are disposed so that the distances from the relay shafts to the corresponding trunnion shafts become roughly equidistant.

3. The working vehicle according to claim 1, wherein the first and second relay shafts are set upward of the positions of the first and second trunnion shafts-respectively.

4. The working vehicle according to claim 1, wherein the first and second relay shafts are provided coaxially or close to each other.

5. The working vehicle according to claim 1, wherein the drive side operating direction of one of the first and second trunnion shaft and the drive side operating direction of the other of the first and second trunnion shaft are established in opposite directions to each other.

6. The working vehicle according to claim 1, wherein the drive side operating direction of one of the first and second trunnion shaft and the drive side operating direction of the other of the first and second trunnion shaft are, respectively, established in the same direction.

* * * * *